No. 774,122. Patented November 1, 1904.

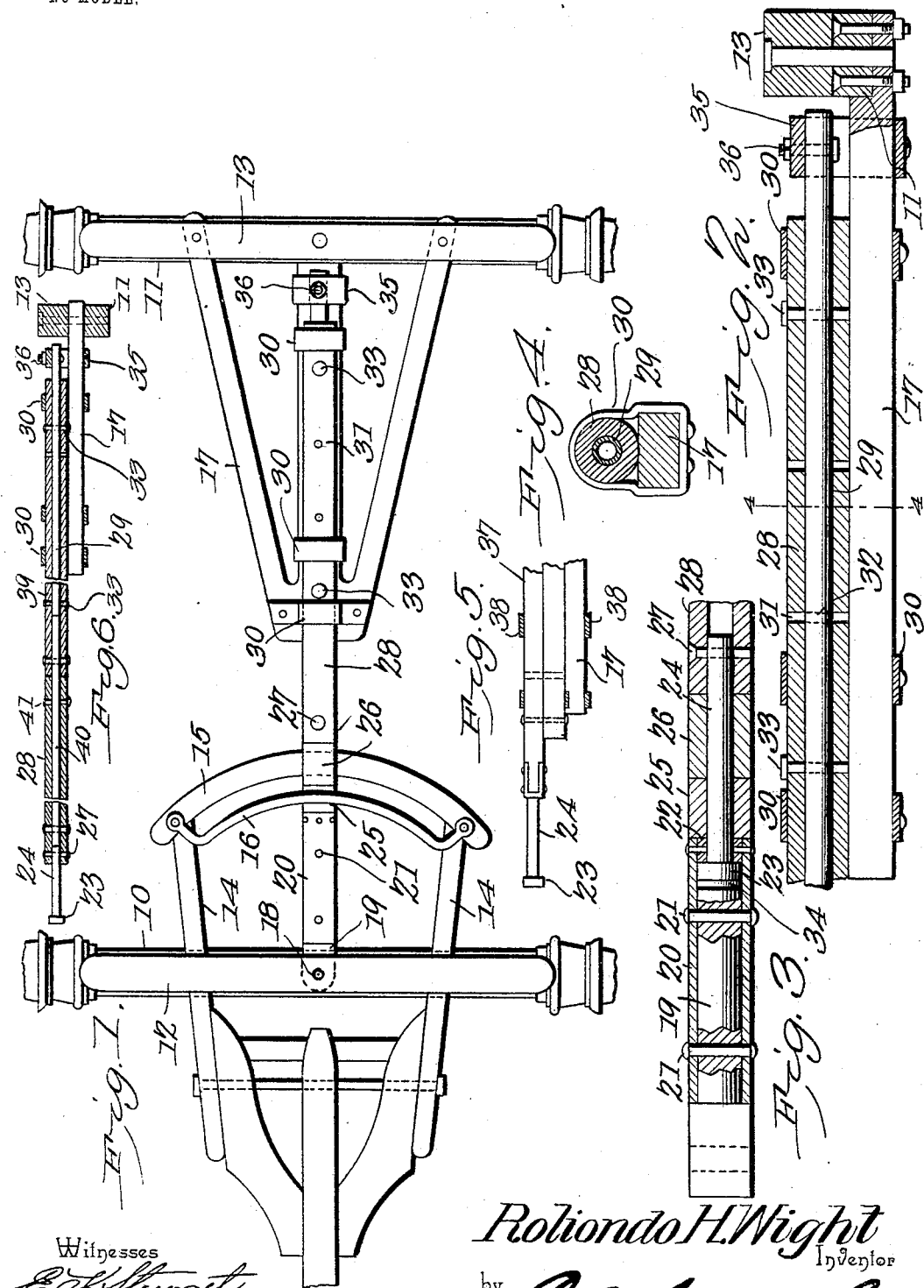

UNITED STATES PATENT OFFICE.

ROLIONDO H. WIGHT, OF DELTA, COLORADO.

VEHICLE RUNNING-GEAR.

SPECIFICATION forming part of Letters Patent No. 774,122, dated November 1, 1904.

Application filed November 12, 1903. Serial No. 180,917. (No model.)

*To all whom it may concern:*

Be it known that I, ROLIONDO H. WIGHT, a citizen of the United States, residing at Delta, in the county of Delta and State of Colorado, have invented a new and useful Vehicle Running-Gear, of which the following is a specification.

This invention relates to the running-gear of vehicles, and has for its object to improve the construction and provide a flexible running-gear which will be strong and durable and yieldable to the various movements of the vehicle and which is adjustable longitudinally.

The invention consists in certain novel features of construction, as hereinafter shown and described, and specified in the claims.

In the drawings illustrative of the invention, in which corresponding parts are denoted by like designating characters, Figure 1 is a plan view. Figs. 2 and 3 are enlarged longitudinal sectional detail views. Fig. 4 is a transverse section on the line 4 4 of Fig. 2. Fig. 5 represents a modified form of the construction. Fig. 6 represents another modified form of the construction.

The improved device may be applied to any of the ordinary lumber or farm wagons and for the purpose of illustration is shown thus applied, 10 representing the forward axle, 11 the rear axle, 12 the forward bolster, 13 the rear bolster, and 14 the forward hounds, connected at their inner ends by the sway-bars 15 16, spaced apart vertically, with the upper bar disposed forwardly of the lower bar, as shown. The rear hounds are represented at 17, extending forwardly of the rear axle.

Pivoted to swing laterally upon the king-bolt 18 is a rod or bar 19, having a sleeve 20 inclosing it and extending rearwardly thereof, the sleeve being rigidly connected to the rod, as by pins or rivets 21. The rearwardly-extended end of the sleeve 20 is provided with an annular flange 22, rigidly secured therein, as by screws or rivets, and forming a socket between the flange and the free end of the rod or bar 19, as shown. Mounted to turn in the socket formed between the flange member 22 and rod 19 is a head 23 of a shaft-section 24, said shaft carrying two friction-rollers 25 26, one for engagement with the upper sway-bar 16 and the other for engagement with the lower sway-bar 15, as shown. Connected, as by pin or bolt 27, to the rear end of the shaft-section 24 in the rear of the roller 26 is a tubular reach-section 28, having inclosed therein another reach-section, 29, preferably tubular, with its rear end connected to the central member of the rear hounds 17, as by a strap 35 and bolt 36. The rear hounds 17 are provided with spaced straps 30, which inclose the tubular reach member 28 and form guiding and coupling means between the rear hounds and rear reach-section. The reach-sections 28 and 29 are each provided with spaced transverse apertures 31 32, adapted to receive coupling-pins 33, by which means the members 28 29 may be adjusted longitudinally to regulate the distance between the axles, as will be obvious. If the member 19 be of wood, as it may be in some forms of vehicle, a metal wear-plate 34 will be interposed between the head member 23 and the member 19 to receive the end thrust and friction and relieve the member 19 from strain and wear. By this simple arrangement a strong and durable reach is produced which will connect the front and rear axles and provide for a free swivel movement between the axle members, so that the forward or rear wheels in running over uneven ground will readily adapt themselves thereto without straining the parts. Thus one of the front wheels may drop into a rut without producing any strain upon the rear axle or its running-gear, and when the rear wheel drops into the same rut no strain will be imparted to the front axle or running-gear.

By having the swivel-joint forward of the sway-bars and the latter operating upon the friction-rollers all torsional and lateral strains are eliminated and a free "universal" movement permitted between the parts. The ability to adjust the reach-sections longitudinally is also an important feature of the invention, as by this means the vehicle may be lengthened or shortened to adapt it to all the various purposes for which this class of vehicles are used.

The device may be modified, as shown in Fig. 5, by substituting for the tubular member 28 a flat member 37 and connecting it, as by the straps 38, similar to the straps 30, to the central member of the rear hounds 17, as shown in Fig. 5; but this would not be a departure from the principle of the invention or sacrifice any of its advantages.

The tubular parts will preferably be of steel, but may be of other metal, if preferred.

If a greater extension than that afforded by the sections 28 and 29 is required, an additional section 39, similar to the section 28, may be employed, as shown in Fig. 6, and coupled to the latter by an internal section 40, tubular or otherwise, similar to the section 29 and connected to the adjacent ends of the sections by bolts or rivets 41, and the section 39 coupled by the pins 33 and straps 30 35 in the same manner as in Figs. 1 and 2; but this modification also would not be a departure from the principle of the invention, as substantially the same results would be produced in substantially the same manner.

When applied to vehicles having no forward hounds, the friction-rollers 25 26 would not be required, as there would be no sway-bars with which to engage.

Having thus described the invention, what I claim is—

1. In a wagon, the combination of the front axle having hounds provided with spaced sway-bars arranged one in advance of the other, the rear axle, a longitudinally-adjustable reach connecting the rear and front axles, a swivel connection between the front axle and the reach, and friction-rollers forming a part of the reach and engaging the sway-bars.

2. In a wagon, the combination of the front axle and king-bolt, the rear running-gear, a rod pivotally connected at one end to said king-bolt, a sleeve provided with a terminal flange inclosing said rod and extending rearwardly thereof, a tubular reach connected to the rear running-gear, and a shaft-section detachably connected to said tubular reach and provided with a lateral head swiveled in rear of flange on said sleeve.

3. In a wagon, the combination of the front axle and king-bolt, hounds secured to the front axle and provided with spaced sway-bars, the running-gear, a forward reach member pivoted to said king-bolt and provided on its rear end with a swivel-socket, a rearward reach member formed of longitudinally-adjustable telescopic sections, a shaft swiveled in the forward reach member, and friction-rollers journaled on said shaft and operating between said sway-bars.

In testimony that I claim the foregoing as my own I have hereto affixed my signature in the presence of two witnesses.

ROLIONDO H. WIGHT.

Witnesses:
MARTIN L. SCHMID,
FRANK P. HUNT.